US011991565B2

United States Patent
Stojanovski et al.

(10) Patent No.: US 11,991,565 B2
(45) Date of Patent: *May 21, 2024

(54) DUAL RADIO OPERATION BETWEEN ACCESS SYSTEMS USING 3GPP RADIO ACCESS TECHNOLOGY

(71) Applicant: Apple Inc., Cupertino, CA (US)

(72) Inventors: Alexandre Saso Stojanovski, Paris (FR); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,211

(22) Filed: Sep. 30, 2021

(65) Prior Publication Data

US 2022/0022105 A1 Jan. 20, 2022

Related U.S. Application Data

(63) Continuation of application No. 16/867,357, filed on May 5, 2020, now Pat. No. 11,172,413, which is a
(Continued)

(51) Int. Cl.
*H04W 36/00* (2009.01)
*H04W 36/14* (2009.01)
(Continued)

(52) U.S. Cl.
CPC ... *H04W 36/0022* (2013.01); *H04W 36/0027* (2013.01); *H04W 36/0069* (2018.08);
(Continued)

(58) Field of Classification Search
CPC ............. H04W 36/0022; H04W 76/28; H04W 36/0069; H04W 36/0027; H04W 36/14;
(Continued)

(56) References Cited

U.S. PATENT DOCUMENTS 8,781,475 B1 7/2014 Mckeeman et al.
2005/0080884 A1 4/2005 Siorpaes et al.
(Continued)

FOREIGN PATENT DOCUMENTS

CN 101448252 A 6/2009
CN 101483585 A 7/2009
(Continued)

OTHER PUBLICATIONS

"International Application Serial No. PCT/US2016/054125, International Search Report mailed Jan. 2, 2017", 3 pgs.
(Continued)

*Primary Examiner* — Ajay Cattungal
(74) *Attorney, Agent, or Firm* — Kowert, Hood, Munyon, Rankin & Goetzel, P.C.

(57) ABSTRACT

Systems and methods of providing 5G access for a UE are generally described. The UE is simultaneously connected via dual radio operation to a legacy and 5G access system. The UE mobility management states for the access systems are independent of each other. The EPC and 5G CN share an HSS and may share a IP anchor. When handover occurs between access systems, the IP address is retained and the IP anchor used when the UE transmits an Attach Request having a Handover Attach Request Type and otherwise a new IP address is provided and the HSS but not the IP anchor is common between the access systems. The 5G eNB to which the UE is connected is standalone and connected to the 5G CN or dual mode and connected with an EPC via an LTE anchor in addition to the 5G CN.

20 Claims, 7 Drawing Sheets

Related U.S. Application Data continuation of application No. 15/766,052, filed as application No. PCT/US2016/054125 on Sep. 28, 2016, now Pat. No. 10,652,786.

(60) Provisional application No. 62/238,064, filed on Oct. 6, 2015.

(51) Int. Cl.
| | |
|---|---|
| *H04W 76/28* | (2018.01) |
| *H04W 88/06* | (2009.01) |
| *H04L 61/4588* | (2022.01) |
| *H04L 61/5007* | (2022.01) |
| *H04W 8/26* | (2009.01) |
| *H04W 36/16* | (2009.01) |
| *H04W 60/04* | (2009.01) |

(52) U.S. Cl.
CPC ........... *H04W 36/14* (2013.01); *H04W 76/28* (2018.02); *H04W 88/06* (2013.01); *H04L 61/4588* (2022.05); *H04L 61/5007* (2022.05); *H04W 8/26* (2013.01); *H04W 36/165* (2013.01); *H04W 60/04* (2013.01)

(58) Field of Classification Search
CPC ..... H04W 88/06; H04W 8/26; H04W 36/165; H04W 60/04; H04L 61/5007; H04L 61/4588

See application file for complete search history.

(56) References Cited

U.S. PATENT DOCUMENTS

| | | | |
|---|---|---|---|
| 2008/0219218 A1 | 9/2008 | Rydnell | |
| 2009/0207812 A1 | 8/2009 | Gupta et al. | |
| 2011/0075557 A1 | 3/2011 | Chowdhury | |
| 2011/0200007 A1* | 8/2011 | Qiang | H04W 80/04 370/331 |
| 2013/0044709 A1* | 2/2013 | Adjakple | H04W 76/15 370/329 |
| 2014/0136660 A1 | 5/2014 | Ghai et al. | |
| 2014/0241317 A1 | 8/2014 | Jamadagni | |
| 2015/0029956 A1* | 1/2015 | Moses | H04W 36/30 370/329 |
| 2015/0103665 A1 | 4/2015 | Kaippallimalil et al. | |
| 2015/0201457 A1 | 7/2015 | Wu et al. | |
| 2015/0263941 A1 | 9/2015 | Jung | |
| 2015/0271725 A1 | 9/2015 | Lee et al. | |
| 2015/0304908 A1* | 10/2015 | Yu | H04W 36/0066 370/331 |
| 2015/0304922 A1* | 10/2015 | Baboescu | H04W 48/18 370/331 |
| 2015/0365862 A1* | 12/2015 | Teyeb | H04W 24/02 455/436 |
| 2016/0165481 A1* | 6/2016 | Jin | H04W 28/0263 370/236 |
| 2016/0183149 A1* | 6/2016 | Stojanovski | H04W 48/08 370/230 |
| 2016/0374137 A1* | 12/2016 | Adjakple | H04W 60/005 |
| 2017/0034749 A1 | 2/2017 | Chandramouli et al. | |
| 2017/0150384 A1 | 5/2017 | Rune | |
| 2017/0188275 A1* | 6/2017 | Kim | H04W 76/15 |
| 2017/0265100 A1* | 9/2017 | Ryu | H04W 36/12 |
| 2018/0020386 A1 | 1/2018 | Chandramouli | |
| 2018/0020418 A1 | 1/2018 | Chandramouli et al. | |
| 2022/0022105 A1* | 1/2022 | Stojanovski | H04W 36/14 |

FOREIGN PATENT DOCUMENTS

| | | |
|---|---|---|
| CN | 103748926 A | 4/2014 |
| CN | 104094666 A | 10/2014 |
| CN | 104469872 A | 3/2015 |
| CN | 106797555 | 5/2017 |
| EP | 2608600 | 6/2013 |

OTHER PUBLICATIONS

"International Application Serial No. PCT/US2016/054125, Written Opinion mailed Jan. 2, 2017", 6 pgs.

"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0 (Sep. 2011) Technical Specification, 50 pgs.

Office Action for Chinese Patent Application No. 201680051611.6, date mailed May 26, 2020, with English translation, 12 pgs.

Office Action for CN Patent Application No. 202110235674.x; Dec. 29, 2023.

CATT "23.401 CR0712: UE IP address allocation in handover Attach procedure", 3GPP TSG-SA WG Meeting #69 S2-087694; Nov. 17, 2008.

Alcatel-Lucent et al. "Handling of S1-MME and S1-U address types with Dual Connectivity", SA WG2 Meeting #106 S2-143914; Nov. 17, 2014.

* cited by examiner

DUAL RADIO OPERATION BETWEEN ACCESS SYSTEMS USING 3GPP RADIO ACCESS TECHNOLOGY

PRIORITY CLAIM

This application is a continuation of U.S. patent application Ser. No. 16/867,357, filed May 5, 2020, titled "Dual Radio Operation Between Access Systems Using 3GPP Radio Access Technology", which is a continuation of Ser. No. 15/766,052, filed Apr. 5, 2018, titled "Dual Radio Operation Between Access Systems Using 3GPP Radio Access Technology", which is a U.S. National Stage Application under 35 U.S.C. 371, from International Application No. PCT/US2016/054125, filed Sep. 28, 2016, which claims the benefit of priority to U.S. Provisional Application No. 62/238,064, filed Oct. 6, 2015. Each of the above identified Applications is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks. Some embodiments relate to interactions between different cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to compatibility of 5G networks with non-5G networks.

BACKGROUND

The use of communication devices, especially mobile communication devices, has continued to increase, in large part due to the increase in available applications and content such as gaming and video streaming. As a result, networks continue to develop, with the next generation wireless communication systems, such as the $4^{th}$ and $5^{th}$ generation (4G, 5G) systems, striving to improve access to information and data sharing. 5G in particular looks to provide a unified network/system that is able to meet vastly different and sometime conflicting performance dimensions and services driven by disparate services and applications while maintaining compatibility with legacy communication devices and applications. Moreover, the incorporation of 5G systems into existing LTE/4G systems to enable seamless integration of the different systems may be undertaken in a number of ways.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
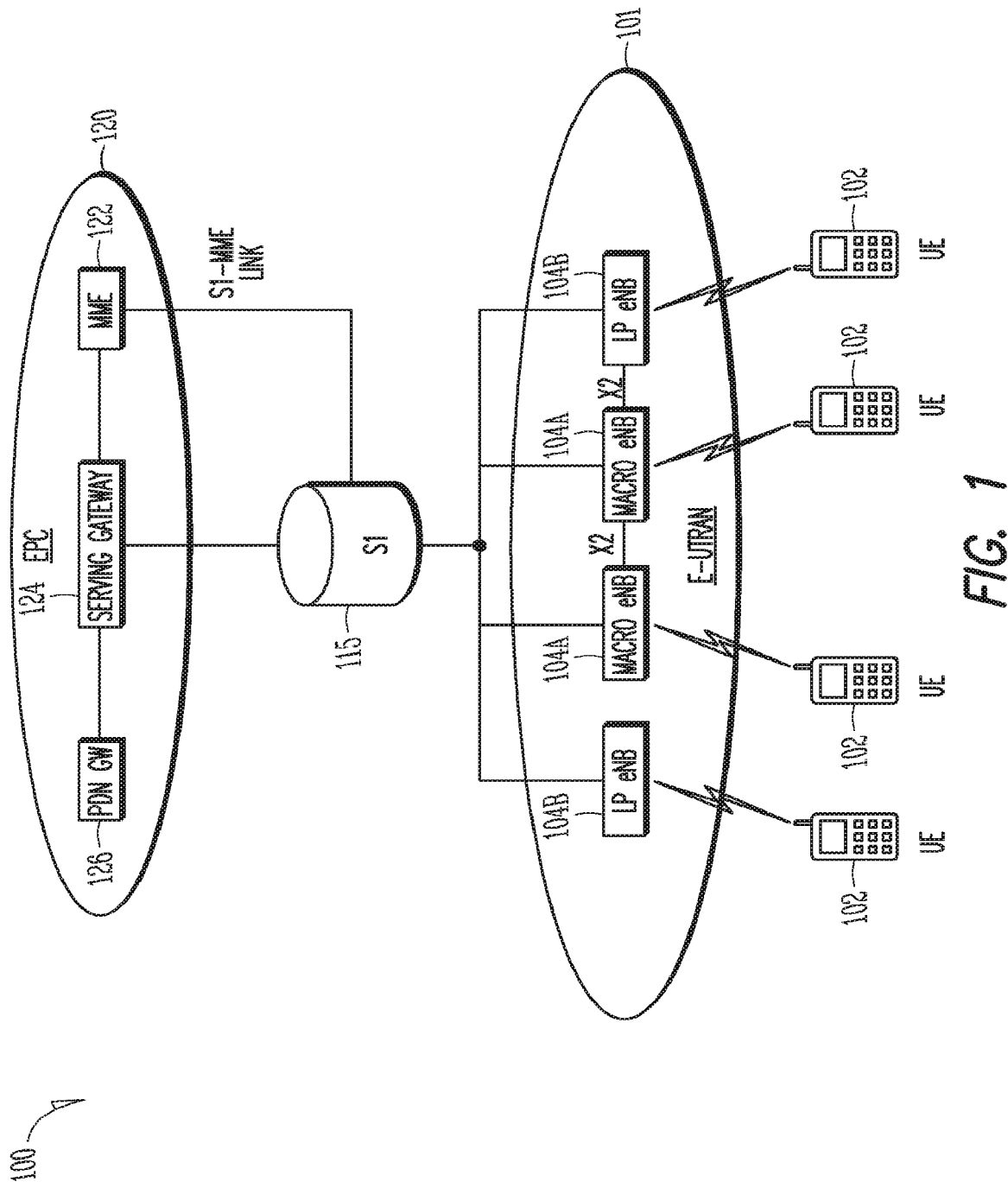
FIG. 1 shows an example of a portion of an end-to-end network architecture of a LTE network in accordance with some embodiments.

FIG. 1 shows an example of a portion of an end-to-end network architecture of a LTE network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. Other elements, such as a Home Location Register (HLR)/Home Subscriber Server (HSS), a database including subscriber information of a 3GPP network that may perform configuration storage, identity management and user state storage, and a Policy and Charging Rule Function (PCRF) that performs policy decision for dynamically applying Quality of Service (QoS) and charging policy per service flow, are not shown for convenience.

The MME 122 may be similar in function to the control plane of legacy Serving GPRS Support Nodes (SGSN). The MME 122 may manage mobility aspects in access such as gateway selection and tracking area list management, performing both mobility management (MM) and session management (SM). The Non-Access Stratum (NAS) is a part of the control plane between a UE 102 and the MME 122. The NAS is used for signaling between the UE 102 and the EPC in the LTE/UMTS protocol stack. The NAS supports UE mobility and session management for establishing and maintaining an IP connection between the UE 102 and PDN GW 126.

The serving GW 124 may terminate the user plane interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and policy enforcement, packet routing, idle mode packet buffering, and triggering an MME to page a UE. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection UE IP address assignment, packet screening and filtering. The PDN GW 126 may also provide an anchor point for mobility devices with a non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB. In some embodiments, when the LP eNB 104b is a Home eNB (HeNB), a HeNB Gateway may be provided between the HeNB and the MME/Service Gateway. This HeNB Gateway may control multiple HeNBs and provide user data and signal traffic from the HeNBs towards the MME/Service Gateway. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality and/or connect via an S1 interface to an MME/Service Gateway. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

In general, the UE 102 may communicate with various types of systems, including a UTRAN and GERAN cell, which may provide voice services only or voice services and low data rate packet services, and an E-UTRAN cell, which may provide packet services only or packet services and voice/video services over packet transport. The UTRAN and GERAN cells may be coupled with a Serving General Packet Radio Subsystem Support Node (SGSN) and mobile switching center (MSC) server. The E-UTRAN may be coupled with the MME 122, which in turn may be coupled with the SGSN and the MSC server. The GERAN and UTRAN RANs may be connected to a circuit-switched (CS) domain of the network 100. For circumstances in which UE 102 is communicating via the E-UTRAN cell when setup of a CS voice call is desired, the mobile network may include a CS fallback (CSFB). In CSFB, the UE 102 in the E-UTRAN cell may engage in a CS call—either by setting up a call or responding to a paging message for a CS call. The network 100 may redirect the UE 102 to a GERAN or UTRAN cell, such as via a packet-switched (PS) handover, via a "release with redirection" procedure, or via a network-assisted cell change over (CCO). In such examples, the UE 102 can set up the mobile originating call or receive the mobile terminating call via the MSC server. Once the CS call is released in GERAN and/or UTRAN cells, the UE 102 may return to the E-UTRAN cell either on its own (e.g., via cell re-selection) or with the help of the GERAN and/or UTRAN (e.g., if, during the release of the radio connection for the CS call the GERAN and/or UTRAN cells commands the UE 102 to immediately select a specific E-UTRAN cell).

In operation, for example during the CS call, if the UE 102 is in a GERAN cell and either does not support the simultaneous use of CS services and packet services, the network 100 may suspend packet services for the UE 102. Downlink packets may not be delivered to the UE 102 but may be forwarded by the PDN GW 126 towards the UE 102. In an example, the UE 102 and/or one of the core network nodes (e.g., the MME and/or the SGSN, as appropriate) may inform the serving GW 124 and/or the PDN GW 126 that the gateways should no longer forward downlink user packets from the UE 102. The MME 122 or SGSN may also deactivate dedicated packet bearers which are used for real-time services. The CS call may be released or during the CS call the UE 102 may be handed over to a cell where CS services and packet services can be used simultaneously. Packet services may then be resumed.

Figure 2:
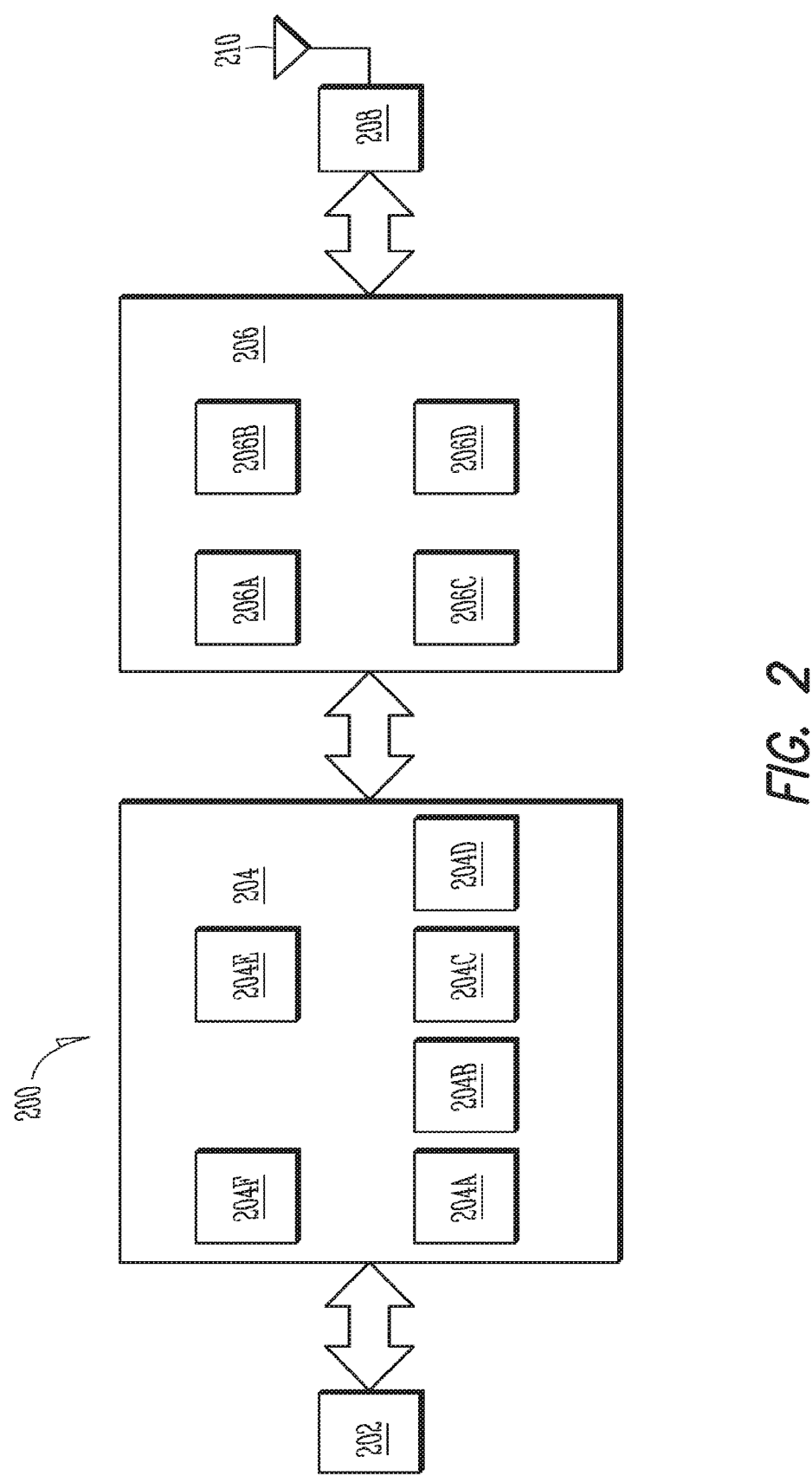
FIG. 2 illustrates components of a communication device in accordance with some embodiments.

FIG. 2 illustrates components of a communication device in accordance with some embodiments. The communication device 200 may be a UE, eNB or other network component as described herein. The communication device 200 may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the MME may contain some or all of the components shown in FIG. 2.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an Evolved UTRON (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 204c of the baseband circuitry 204 may be configured to run elements of the protocol stack for signaling of the PHY, MAC. RLC, PDCP and/or RRC layers, and/or NAS. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UNITS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
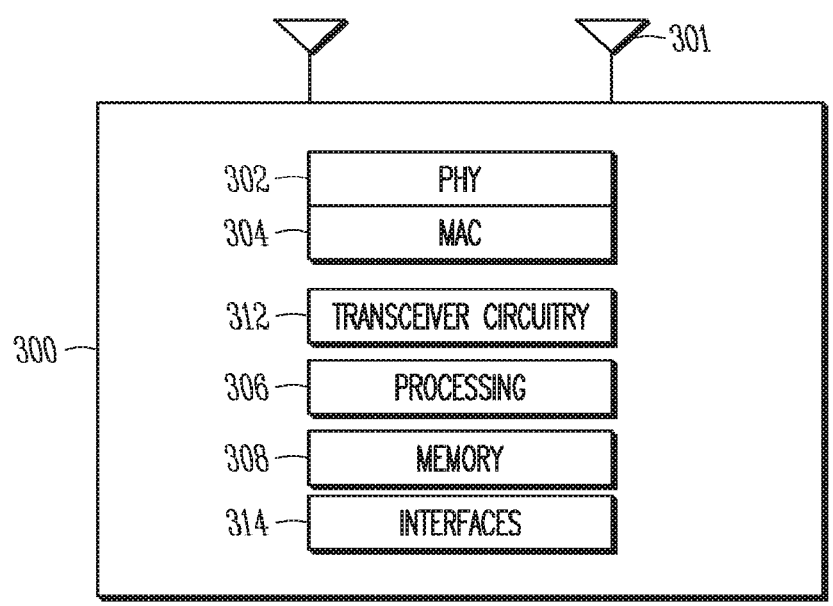
FIG. 3 illustrates a block diagram of a communication device in accordance with some embodiments.

FIG. 3 is a block diagram of a communication device in accordance with some embodiments. The device may be a UE, for example, such as the UE shown in FIG. 1. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax. WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
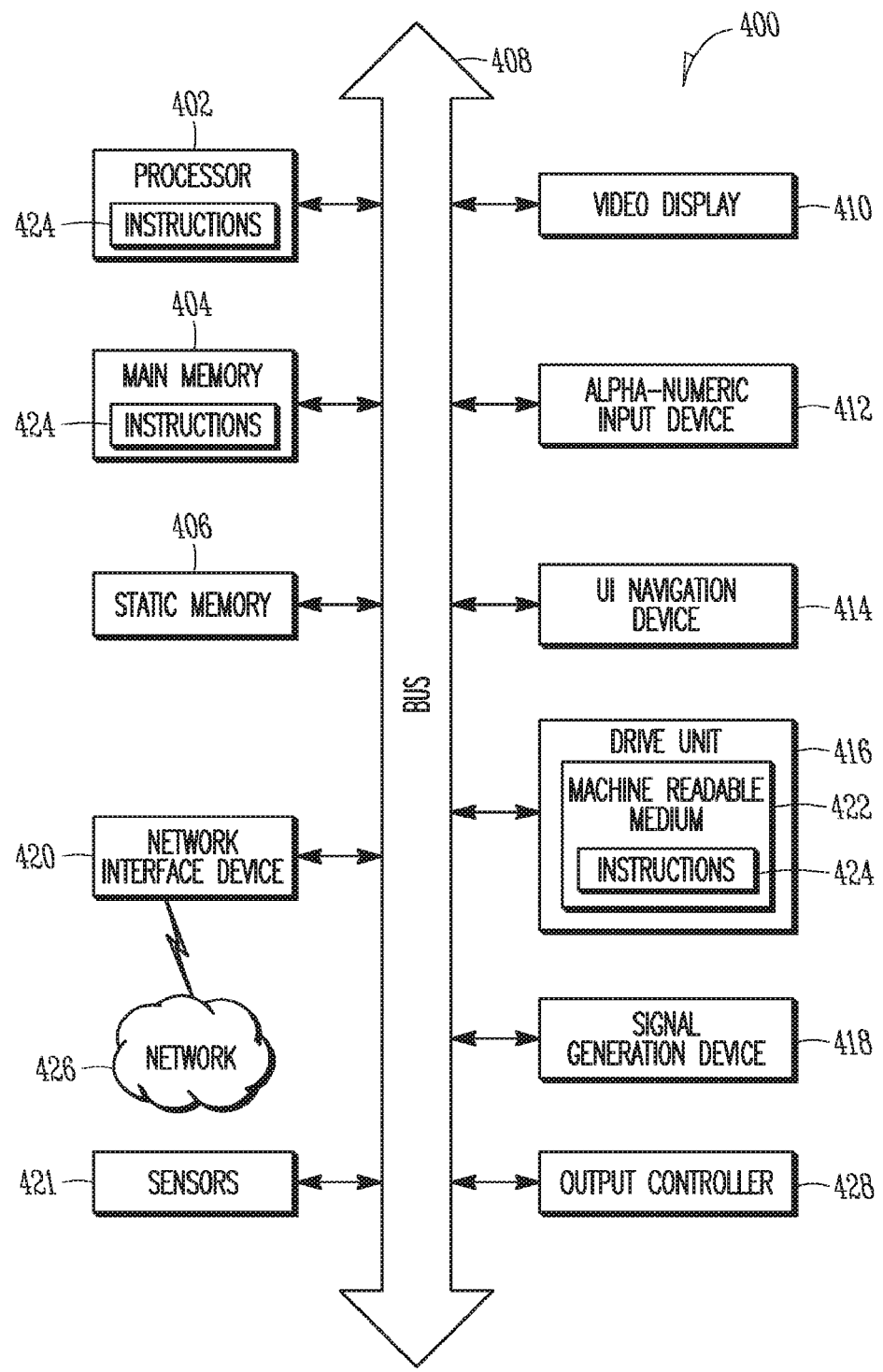
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as WiFi®, IEEE 802.16 family of standards known as WiMax*). IEEE 802.15.4 family of standards, a LTE family of standards, a UNITS family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

To support the coming connectivity needs, standardization of next generation (5G) cellular technology is currently under discussion. One or more new radio access technologies (RATs) have yet to be defined. The addition of 5G systems to the 4G systems described above may involve several phases to enable the various user and network goals to be achieved. For example, considering mobile broadband, one desire is to provide a substantially uniform user experience independent of the type of UE, amount of network traffic, radio access technology used, etc. To this end, the waveforms and frame structure used by 5G systems, as well as the inter and intra-RAT interconnectivity with existing 4G and earlier systems, may be standardized. For example, some of the issues with 5G systems to be standardized include the use of additional spectrum, including ultra-high frequencies of up to about 100 GHz and of the unlicensed band, as well as the use of advanced techniques such as multi-site MIMO, beamforming and scalable bandwidths.

At present, two phases may be used in implementation of 5G systems. Phase 1 of implementation of the 5G system may be to address an initial subset of the International Mobile Telecommunication (IMT)-2020 requirements, while Phase 2 addresses the remaining requirements. Phase 1 may introduce a new RAT that is not backwards compatible to LTE and may be specifically optimized for enhanced mobile broadband (eMBB) Phase 1 may support a wider spectrum range than present LTE systems, up to about 30-40 GHz, and use both time and frequency division duplexing (TDD, FDD). Phase 2 may be optimized for all 5G use cases and may support a frequency range of between about 0.3 and 100 GHz using flexible TDD and FDD frame structures.

Figure 5:
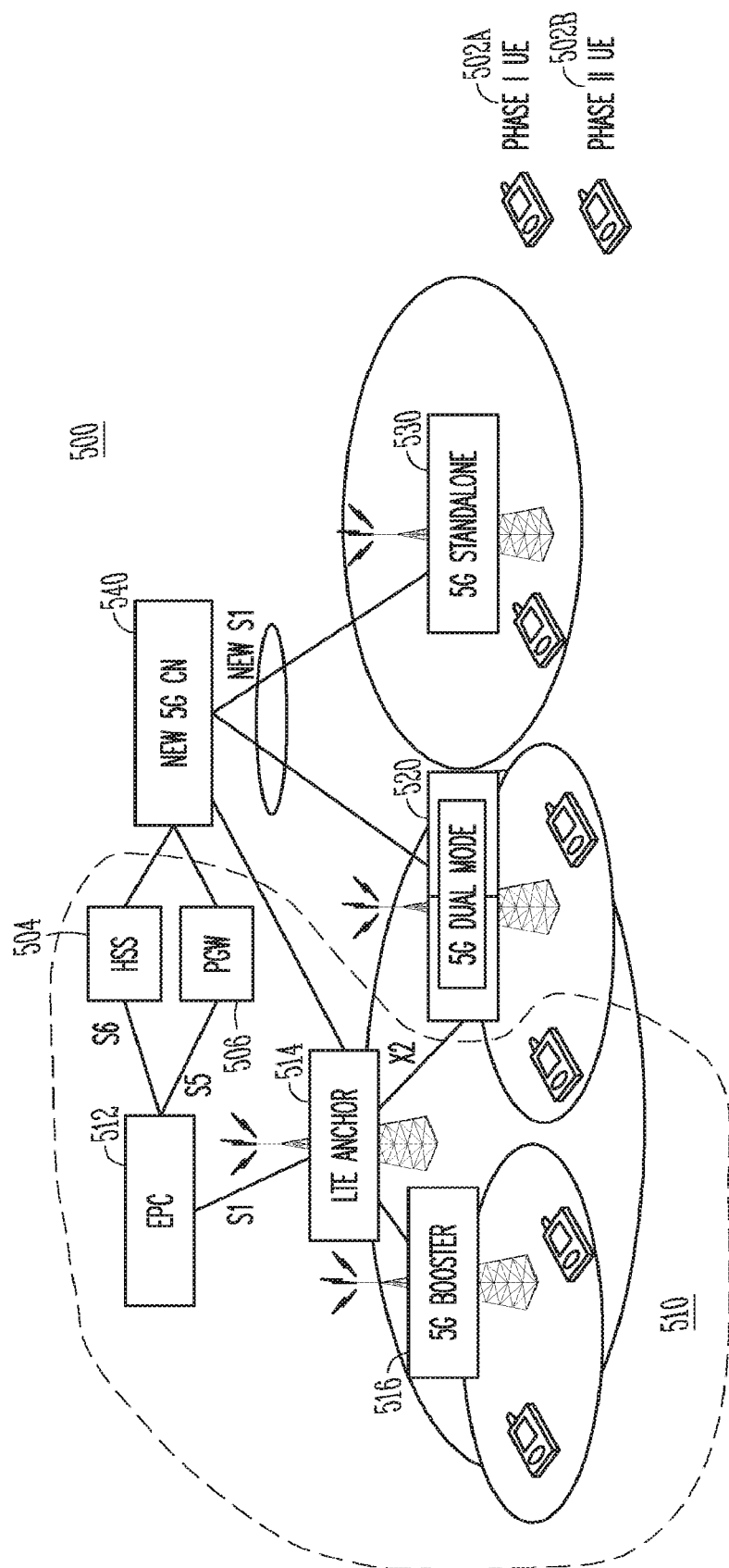
FIG. 5 illustrates a wireless communication system in accordance with some embodiments.

FIG. 5 illustrates a wireless communication system in accordance with some embodiments. The system 500 of FIG. 5 illustrates one embodiment of a Phase 1 system 510 and Phase 2 deployment with Phase 1 and Phase 2 UEs 502*a*, 502*b* being disposed in cells of each type. In particular, Phase 1 deployment 500 may focus on a non-standalone 5G RAT cell 516 operating in Dual Connectivity (DC) mode as a booster cell controlled by an LTE-based anchor cell 514 through an X2 interface. The 5G booster cell 516 may provide additional capacity within a predetermined area inside an anchor cell 514, which may employ a different RAT than the booster cell. The 5G booster cell 516 may only communicate with the LTE anchor cell 514 in Phase 1. The LTE anchor cell 514 and 5G booster cell 516 may be used, for example, in a Coordinated Multipoint (CoMP) system.

In downlink CoMP, the anchor and booster cells 514, 516 may provide overlapping coverage and may coordinate transmissions to a Phase 1 or Phase 2 UE 502*a*. 502*b*. In uplink CoMP, the reception of UE signals may be coordinated among the cells 514, 516 to improve network performance at cell edges. The cells 514, 516 providing the overlapping coverage may be a homogeneous set of macro cells or may be heterogeneous, including a macro anchor cell and a LP booster 5G cell. The cells 514, 516 may be geographically separated but dynamically coordinated through a high-speed backhaul to provide joint scheduling and transmissions as well as proving joint processing of the received signals. CoMP may use different techniques, which include Joint Processing, Dynamic Point Selection and Coordinated scheduling/beamforming. In Joint Processing, the cells 514, 516 may transmit data on the same frequency in the same subframe and/or uplink transmissions from the Phase 1 or Phase 2 UE 502*a*, 502*b* may be received by the cells 514, 516 and combined to improve the signal quality and strength and perhaps actively cancel interference from transmissions that are intended for other UEs. This may increase the amount of data in the network dependent upon how many cells transmit the data. Uplink transmissions from the Phase 1 or Phase 2 UE 502*a*, 502*b* may be detected by antennas at the different cells 514, 516, which may form a virtual antenna array. The signals received by the cells 514, 516 may be combined and processed to increase the strength of low strength signals or those masked by interference. In Dynamic Point Selection, data may available for transmission at multiple cells 514, 516 but only scheduled from cells 514, 516 in each subframe. In Coordinated scheduling/beamforming, each cell 514, 516 in the CoMP area may transmit data to the UE in different subframes while scheduling decisions as well as beam coordination are coordinated among the cells 514, 516. In some embodiments, blanking or muting of signals from one cells 514, 516 may be used when another cell 514, 516 is transmitting to decrease interference.

The LTE anchor cell 514 (and thus 5G booster cell 516) may be connected with an LTE core network (EPC) 512 through an S1 interface similar to the system shown in FIG. 1. The EPC 512 may be connected with the HSS 504 through an S6a interface and with the PGW 506 through an S5 interface. The PGW 506 may serve as an IP anchor for the Phase 1 or Phase 2 UE 502*a*, 502*b*. By anchoring the 5G booster cell 516 at an LTE anchor 514, the EPC 512 may perceive only the LTE cell 514, thereby allowing both cells 514, 516 to be supported with the legacy EPC network 512 with minimal or no changes.

In some embodiments of a Phase 1 deployment, a 5G stand-alone cell 530 may be present in addition to the 5G booster cell 516. In other Phase 1 embodiments, the 5G standalone cell 530 may not be present—instead being a Phase 2 deployment. The 5G standalone cell 530 may be connected via a 5G S1 interface with a new 5G core network 540. The 5G core network 540 may be connected with the HSS 504 through an interface, which may be the same as the S6a interface between the LTE EPC 512 and the HSS 504 or may be a 5G S6a interface that differs from the S6a interface between the LTE EPC 512 and the HSS 504. Connection between the LTE EPC 512 and the 5G core network 540 may be limited in some embodiments to HSS 504 access. The 5G core network 540 in certain embodiments may be connected with an IP anchor function equivalent to the PGW 506 through a 5G S5 interface.

A Phase 2 deployment is also depicted in FIG. 5. In Phase 2, both a 5G non-standalone (dual mode) cell 520 and the 5G standalone cell 530 may be connected with the 5G core network 540 via a 5G S1 interface. The 5G non-standalone cell 520 may be additionally connected with the LTE anchor cell 514 through an X2 interface. Phase 1 or 2 may define provisions for the standalone 5G RAT cell 530 that connects to the 5G core network 540. The 5G non-standalone cell 520 may be upgraded to support dual mode operation. In dual mode, the 5G non-standalone cell 520 may act as a booster cell to the LTE anchor 514 through the X2 interface with connection to the EPC 512, or may act as a stand-alone cell connected to the new 5G core network 514 through the 5G S1 interface.

Phase 1 UEs 502*a* may be steered to the 5G booster mode cell 516 or to a plain LTE cell, such as the LTE anchor cell 514. Phase 2 dual mode cells 520 may, on the other hand, be capable of supporting both booster and standalone mode of operation. The booster mode may be used for Phase 2 UEs 502*b* only when the Phase 2 UEs 502*b* are in coverage of a 5G booster cell that has not been upgraded for dual-mode operation. The LTE anchor 514 may be upgraded to steer communications of Phase 2 UEs 502*b* to the 5G core network 540 through a 5G S1 interface and of legacy UEs 502*a* to the EPC 512. If the LTE anchor 514 is not upgraded, communications of all of the Phase 1 or Phase 2 UE 502*a*. 502*b* may be directed to the EPC 512. The LTE anchor 514 may support the LTE-Uu interface independent of whether or not the LTE anchor 514 is able to communicate with the 5G core network 540. Phase 2 UEs may contain multiple radios (including transmit/receive chains and other circuitry) that are configured to communicate using the different RATs, e.g. for LTE and 5G communications.

In some embodiments, the 5G core network 540 may permit service continuity when the Phase 1 or Phase 2 UE 502a, 502b moves between the Phase 1 and Phase 2 networks, or between Phase 2 and other legacy networks, such as EPS networks with 2G, 3G or LTE access. The 5G core network 540 may, however, carry little to none of the baggage of the legacy LTE core network 512. The use of a dual radio operation in the Phase 1 or Phase 2 UE 502a, 502b may facilitate interworking between the legacy 4G access system (i.e., radio access network and corresponding Core Network) and the 5G generation access system by minimizing the legacy baggage carried over to the 5G generation system, while still allowing for service continuity as UE moves from one access system to another In the dual radio operation, both access systems may rely on a 3GPP RAT but may have significantly different packet core networks. The legacy side of the access system may thus be composed of the 3GPP EPC network 512 and one of the following 3GPP RATs: 2G/GPRS, 3G/UMTS, 4G/LTE or LTE-anchored 5G booster cell operating in Dual Connectivity (DC) mode; the 5G side the access system may be composed of the 5G core network 540 and the standalone 5G cell 530. As above, the LTE anchor cell 514 may be upgraded to support the 5G core network-RAN interface towards the 5G core network 540 or the system 500 may operate using dual radio operation.

When the EPS was defined by 3GPP in the Release 8 specifications, interworking between the 3GPP-defined RATs (2G/GPRS, 3G/UMTS, 4G/LTE) was assumed of the single radio type. This is to say that at any point in time a single radio UE may be connected to only one RAT type. In contrast, interworking with EPC-connected non-3GPP radio access technologies (e.g., WLAN) also allows for dual radio operation where the UE can simultaneously be connected to both a 3GPP RAT (i.e., to the EPC via an LTE cell) and to a WLAN (i.e., via an EPC-connected WLAN). One benefit of dual radio operation is that it allows for loose coupling between the two access systems, in that each access system can have its own authentication, mobility management, PDN connection model, session management, QoS and bearer schemes, while still allowing for IP address continuity when UE moves traffic from one access system to the other. The different access systems may perform independent mobility management mechanisms. For instance, the UE can be in Connected mode in one access system, while being Idle mode in the other access system.

As shown in FIG. 5, the dual radio interworking may also be used between two access systems both of which are based on a 3GPP RAT, e.g. between EPC-connected 3GPP RATs and New 5G CN-connected 3GPP RATs. The convergence point between the two access systems that are interworked in dual radio mode may be limited to only the HSS 504. In other embodiments, another convergence point may be the PGW 506. As above, the PGW (or PDN GW) may route data packets between the EPC 512 and an external PDN for an EPC-attached UE or between the 5G core network 540 and that same external PDN for a 5G CN-attached UE. The HSS 504 may store the user subscription data that is common for all accesses.

In some embodiments, it may be desirable to preserve the IP address when handing over between the legacy network and the 5G network; in other embodiments an entirely new IP address may be used when handover occurs between the networks. In some embodiments, a common PGW 506 may be used only in cases in which IP address preservation is used when traffic is moved from one access system to another. Whether or not IP address preservation is desirable may depend on the applications operating. In particular, a number of currently available applications may be capable of surviving IP address changes without breaking the session. Such applications include, for example, SIP-based applications, Dynamic Adaptive Streaming over HTTP (DASH), or transport protocols (e.g., MultiPath TCP). While these applications are presently in the minority, the number of applications that have the capability to survive IP address changes may continue to grow as 5G systems become increasingly widespread.

Figure 6:
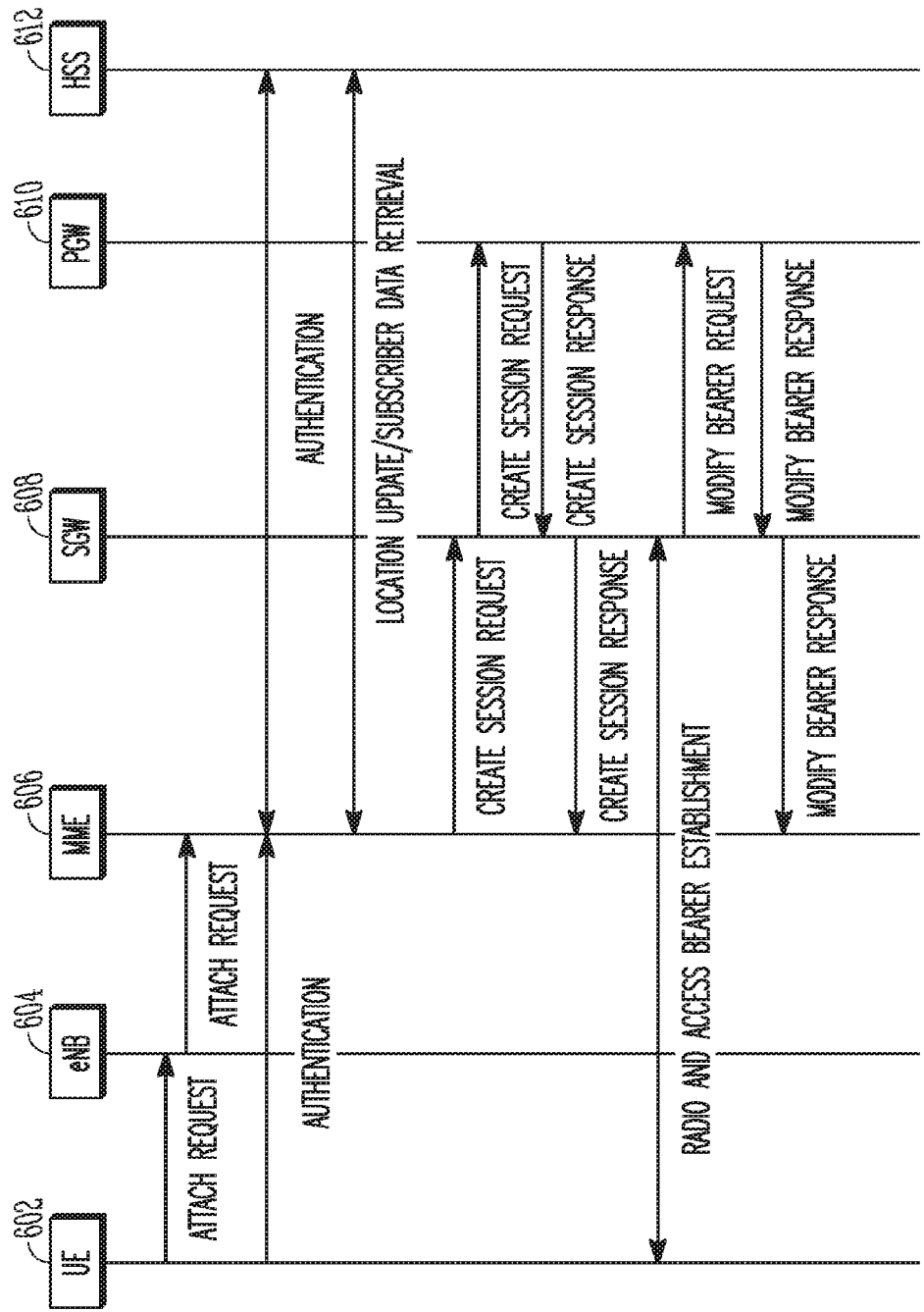
FIG. 6 illustrates handover with IP address preservation in accordance with some embodiments.

Handover between the systems may be performed by using an LTE Attach procedure or 5G equivalent. FIG. 6 illustrates handover with IP address preservation in accordance with some embodiments. FIG. 6 shows a non-roaming scenario of Network-Based IP Flow Mobility (NBIFOM) functionality. An example of a handover without IP address preservation is not shown for brevity. In either case, handover may be undertaken using the UEs and eNBs shown in any of FIGS. 1-5.

If IP address preservation for a PDN connection is desired, handover for that PDN connection may be performed using the Handover Attach procedure or its 5G equivalent, which allows the target access system to retrieve the already selected PGW whose address is stored in the HSS. FIG. 6 illustrates a scenario in which handover occurs from a non-3GPP IP access to the E-UTRAN connected to the EPC. As shown, after determining that handover is appropriate, the UE 602 may send an Attach Request to the MME 606 via the eNB 604. The Attach request may indicate with Request Type indicating Handover Attach. The UE 602 may include an Access Point Name (APN) corresponding to the PDN connections. The MME 606 may contact the HSS 612 and authenticate the UE 602.

After successful authentication, the MME 606 may perform a location update procedure and subscriber data retrieval from the HSS 612. Since the Request Type is Handover, the identity of the PGW 610 serving the UE 602 may be stored in a PDN subscription context and conveyed to the MME 606. The MME 606 may receive PDN information of the UE 602 in the Subscriber Data obtained from the HSS 612. The MME 606 may select an APN, a SGW 608 and PGW 610 and send a Create Session Request message to the selected SGW 608. The Create Session Request message may contain Handover Indication information. The SGW 608 may then send a Create Session Request message to the PGW 610 with the Handover Indication information indicated by the MME 606.

The PGW 610 may execute a PCEF-Initiated IP CAN Session Modification Procedure or a IP CAN Session Establishment with the PCRF depending on whether the UE 602 disconnected from the default PDN before handover. In some cases, dedicated bearers may be established for the UE 602. The PGW 610 may send a Create Session Response message to the SGW 608. The Create Session Response may contain the IP address. The SGW 608 in turn sends a Create Session Response message to the MME 606. The Create Session Response message also includes the IP address of the UE 602 and serves as an indication to the MME 606 that the S5 bearer setup and update has been successful—the PMIPv6 or GTP tunnel(s) over S5 may thus be established.

The Radio and Access bearers may be established using RRC signalling. The MME 606 may send a Modify Bearer Request message to the SGW 608, which the SGW 608 may then send to the PGW 610 to initiate packet routing to the SGW 608 for the default and any dedicated EPS bearers established. The PGW 610 may respond with a Modify Bearer Response to the SGW 608, which the SGW 608 may then send to the MME 606. The UE 602 may transmit and receive data.

In some embodiments, the EPC may be able to make a determination of whether to maintain the IP address during handover (and thus the same PGW is to be used) or whether a new IP address is to be used after handover (and thus a different PGW is to be used). This decision may be based on various factors such as the type of UE (whether 5G capable or not), the bearers established for the UE (which may be related to the applications available for the UE or UE priority, among others), as well as the functionality of the 5G and LTE eNBs. As indicated above, the IP flow mobility between the EPC-based access system and the 5G core network-based access system may be based on a multi-access PDN connection that is anchored in the common PGW.

Figure 7:
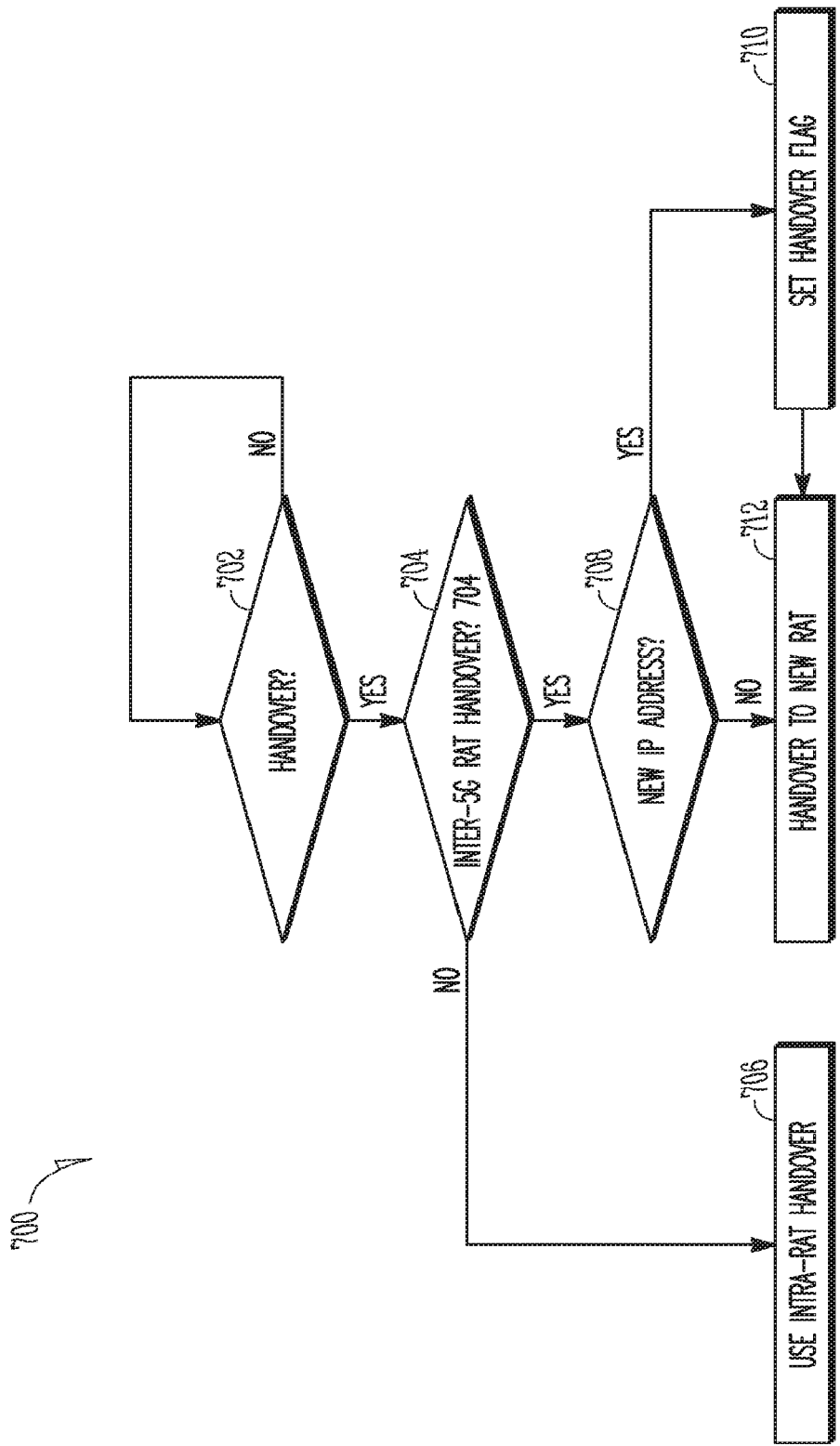
FIG. 7 illustrates a flow diagram of handover in accordance with some embodiments.

FIG. 7 illustrates a flow diagram of handover in accordance with some embodiments. Handover may be undertaken using the UEs and eNBs shown in any of FIGS. 1-5. At operation 702, the UE may discover new cells and determine whether handover is appropriate. Handover may be based, for example, on measured cell-specific reference signals (CRS) from the different cells as well as UE mobility and other factors. The UE may measure the reference signal receive power (RSRP) and/or reference signal receive quality (RSRQ), among others to make the determination. The UE may be able to operate in single mode or in dual mode, in the latter of which the UE may be simultaneously attached to an EPC via an LTE cell (either directly or through a 5G booster cell) and to a 5G core network via a standalone 5G cell. The mobility management mechanisms for the access systems may be independent, permitting the UE to be in the same or different modes for the different cells. In some embodiments, the UE can be simultaneously attached to both the EPC and 5G core network without using the two RATs simultaneously.

At operation 704, the process 700 branches dependent on whether the handover is an inter- or intra-RAT handover. In particular, if the handover is between LTE cells or between 5G cells, at operation 706 the handover process may use operations associated with either a conventional LTE handover or a 5G handover, as desired.

On the other hand, if the handover occurs between an LTE cell or 5G cell booster cell anchored by a LTE cell and a 5G cell, at operation 708, it may be determined whether a new IP address is to be assigned. The 5G cell may either be a dual mode cell connected with both the EPC with which the LTE anchor cell is connected and the 5G core network, or a 5G standalone connected with the 5G core network but not the EPC.

If a new IP address is to be used, at operation 710, the UE sets a handover flag in an Attach message. The Attach message is then transmitted to the new cell. Whether or not a new IP address is to be used may depend on factors such as the UE type and capabilities.

At operation 712 handover is initiated. In situations in which a new IP address is used, the only point of commonality between the EPC and the 5G core network may be the HSS, which contains the subscriber information for use in the new cell. In situations in which the original IP address is retained, both the HSS and the PGW may serve as points of commonality between the EPC and the 5G core network, with the new cell using the original PGW, which may serve as an IP anchor and whose information is retrieved from the HSS during the handover procedure.

EXAMPLES

Example 1 is an apparatus of user equipment (UE), the apparatus comprising: memory; and processing circuitry in communication with the memory and arranged to: determine whether the UE is configured for handover between an evolved NodeB (eNB) connected with an evolved packet core (EPC) of a Long Term Evolution (LTE) network and a base station connected with a 5th generation (5G) core network; determine whether to retain an internet protocol (IP) address associated with the LTE network or 5G core network during handover; and in response to a determination that IP address retention is to occur, encode an Attach Request for transmission to one of the eNB or the base station, the Attach Request comprising a Request Type that indicates a Handover Attach.

In Example 2, the subject matter of Example 1 optionally includes that the UE is attached to a 5G booster eNB connected with a LTE anchor either prior to or after handover.

In Example 3, the subject matter of any one or more of Examples 1-2 optionally include that the UE is attached to a 5G standalone eNB that is connected with the 5G core network and is free from being connected with the EPC either prior to or after handover.

In Example 4, the subject matter of any one or more of Examples 1-3 optionally include that the UE is attached to a 5G dual mode eNB that is connected with the 5G core network and is connected with the EPC through a LTE anchor eNB either prior to or after handover.

In Example 5, the subject matter of any one or more of Examples 1-4 optionally include, further comprising: a plurality of radios configured to connect with different radio access technologies (RATs), the RATs comprising LTE and 5G, wherein the processing circuitry is further arranged to configure the UE to operate in dual mode in which the UE is simultaneously connected with the EPC and the 5G core network via the different RATs.

In Example 6, the subject matter of Example 5 optionally includes that the processing circuitry is further arranged to: configure the UE to operate in one of a Connected or Idle mode associated with each of the EPC and the 5G core network, the one of the Connected or Idle mode associated with the EPC independent of the one of the Connected or Idle mode associated with the 5G core network.

In Example 7, the subject matter of any one or more of Examples 1-6 optionally include that the processing circuitry is further arranged to: in response to a determination that a new IP address is to be assigned during handover, cause the transceiver to transmit to one of the eNB or base station an Attach Request comprising a Request Type that is free from an indication of a Handover Attach.

In Example 8, the subject matter of any one or more of Examples 1-7 optionally include that the processing circuitry comprises a baseband processor, and the apparatus further comprises a transceiver configured to communicate with the at least one of the eNB or base station.

Example 9 is an apparatus of a base station, the apparatus comprising: a memory, and processing circuitry in communication with the memory and arranged to: decode from a user equipment (UE) an Attach Request that comprises a Request Type that is selectable by the UE between a Handover Attach and a non-Handover Attach, the Handover Attach being an indication of Internet Protocol (IP) address retention during handover; and encode the Attach Request for transmission to a mobility management entity (MME) to complete handover with the UE based on the Attach Request.

In Example 10, the subject matter of Example 9 optionally includes that an operation mode associated of the UE after completion of handover is independent of an operation mode of the UE associated with another base station to which the UE is simultaneously connected, the operation mode comprising one of a Connected or Idle mode.

In Example 11, the subject matter of any one or more of Examples 9-10 optionally include that the base station is a 5G booster eNB connected with a LTE anchor.

In Example 12, the subject matter of any one or more of Examples 9-11 optionally include that the base station is a 5G standalone eNB that is connected with a 5G core network.

In Example 13, the subject matter of any one or more of Examples 9-12 optionally include that the base station is a 5G dual mode eNB that is connected with a 5G core network and is connected with an EPC through a LTE anchor eNB.

Example 14 is a computer-readable storage medium that stores instructions for execution by one or more processors, the one or more processors to: establish simultaneous operation between a user equipment (UE) and both a Long Term Evolution (LTE) access system and a 5th generation (5G) access system, the LTE access system comprising an evolved packet core (EPC), the 5G access system comprising a 5G core network, wherein the UE is configured to operate in an LTE mobility management state and a 5G mobility management state, the LTE mobility management state and the 5G mobility management state independent of each other.

In Example 15, the subject matter of Example 14 optionally includes that the EPC and the 5G core network share a Home Subscriber Storage (HSS) node.

In Example 16, the subject matter of Example 15 optionally includes that the EPC and the 5G core network share an Internet Protocol (IP) anchor.

In Example 17, the subject matter of Example 16 optionally includes that the instructions further configure the one or more processors to: retain an IP address of the UE during handover of the UE between access systems using the IP anchor and the HSS in response to the UE using an Attach Request comprising a Request Type that indicates a Handover Attach.

In Example 18, the subject matter of any one or more of Examples 16-17 optionally include that the instructions further configure the one or more processors to: assign a new IP address to the UE during handover of the UE between access systems using the IP anchor and the HSS in response to the UE using an Attach Request comprising a Request Type that is free from an indication of a Handover Attach.

In Example 19, the subject matter of any one or more of Examples 14-18 optionally include that the UE is connected with the EPC through a radio access network that uses a radio access technology selected from one of: General Packet Radio Services (GPRS), Universal Mobile Telecommunications System (UMTS), a 4th generation (4G) system or an LTE-anchored 5G booster cell operating in Dual Connectivity mode.

In Example 20, the subject matter of any one or more of Examples 14-19 optionally include that the UE is connected with the 5G core network through a radio access network relying on a standalone 5G radio access technology.

In Example 21, the subject matter of any one or more of Examples 14-20 optionally include that the UE retains independent Packet Data Network (PDN) connections for each of the LTE and 5G access systems.

In Example 22, the subject matter of any one or more of Examples 14-21 optionally include that the instructions further configure the one or more processors to: provide a multi-access Packet Data Network (PDN) connection for the UE, the multi-access PDN connection having a connection established with each of the LTE and 5G access systems with an Internet Protocol (IP) anchor that is common to both the LTE and 5G access systems.

In Example 23, the subject matter of Example 22 optionally includes that the UE uses IP flow mobility (NBIFOM) mechanisms when handing over an IP flow from one of the LTE and 5G access systems to the other of the LTE and 5G access systems.

In Example 24, the subject matter of any one or more of Examples 14-23 optionally include that at least one of: the UE is attached to a 5G booster eNB connected with a LTE anchor, the UE is attached to a 5G standalone eNB that is connected with the 5G core network and is free from being connected with the EPC, or the UE is attached to a 5G dual mode eNB that is connected with the 5G core network and is connected with the EPC through a LTE anchor eNB.

Example 25 is a method of providing a 5th generation (5G) access to a user equipment (UE), the method comprising: establishing simultaneous operation between the UE and both a Long Term Evolution (LTE) access system and a 5G access system, the LTE access system comprising an evolved packet core (EPC), the 5G access system comprising a 5G core network; and configuring the UE to operate in an LTE mobility management state and a 5G mobility management state, the LTE mobility management state and the 5G mobility management state independent of each other.

In Example 26, the subject matter of Example 25 optionally includes that the EPC and the 5G core network share a Home Subscriber Storage (HSS) node.

In Example 27, the subject matter of Example 26 optionally includes that the EPC and the 5G core network share an Internet Protocol (IP) anchor.

In Example 28, the subject matter of Example 27 optionally includes, further comprising: retaining an IP address of the UE during handover of the UE between access systems using the IP anchor and the HSS in response to the UE using an Attach Request comprising a Request Type that indicates a Handover Attach.

In Example 29, the subject matter of any one or more of Examples 27-28 optionally include, further comprising: assigning a new IP address to the UE during handover of the UE between access systems using the IP anchor and the HSS in response to the UE using an Attach Request comprising a Request Type that is free from an indication of a Handover Attach.

In Example 30, the subject matter of any one or more of Examples 25-29 optionally include that the UE is connected with the EPC through a radio access network that uses a radio access technology selected from one of: General Packet Radio Services (GPRS), Universal Mobile Telecommunications System (UMTS), a 4th generation (4G) system or an LTE-anchored 5G booster cell operating in Dual Connectivity mode.

In Example 31, the subject matter of any one or more of Examples 25-30 optionally include that the UE is connected with the 5G core network through a radio access network relying on a standalone 5G radio access technology.

In Example 32, the subject matter of any one or more of Examples 25-31 optionally include that the UE retains independent Packet Data Network (PDN) connections for each of the LTE and 5G access systems.

In Example 33, the subject matter of any one or more of Examples 25-32 optionally include, further comprising: providing a multi-access Packet Data Network (PDN) connection for the UE, the multi-access PDN connection having a connection established with each of the LTE and 5G access systems with an Internet Protocol (IP) anchor that is common to both the LTE and 5G access systems.

In Example 34, the subject matter of Example 33 optionally includes that the UE uses IP flow mobility (NBIFOM) mechanisms when handing over an IP flow from one of the LTE and 5G access systems to the other of the LTE and 5G access systems.

In Example 35, the subject matter of any one or more of Examples 25-34 optionally include that at least one of: the UE is attached to a 5G booster eNB connected with a LTE anchor, the UE is attached to a 5G standalone eNB that is connected with the 5G core network and is free from being connected with the EPC, or the UE is attached to a 5G dual mode eNB that is connected with the 5G core network and is connected with the EPC through a LTE anchor eNB.

Example 36 is an apparatus of a user equipment (UE), the apparatus comprising: means for establishing simultaneous operation between the UE and both a Long Term Evolution (LTE) access system and a 5th generation (5G) access system, the LTE access system comprising an evolved packet core (EPC), the 5G access system comprising a 5G core network; and means for configuring the UE to operate in an LTE mobility management state and a 5G mobility management state, the LTE mobility management state and the 5G mobility management state independent of each other.

In Example 37, the subject matter of Example 36 optionally includes that the EPC and the 5G core network share a Home Subscriber Storage (HSS) node.

In Example 38, the subject matter of Example 37 optionally includes that the EPC and the 5G core network share an Internet Protocol (IP) anchor.

In Example 39, the subject matter of Example 38 optionally includes, further comprising: means for retaining an IP address of the UE during handover of the UE between access systems using the IP anchor and the HSS in response to the UE using an Attach Request comprising a Request Type that indicates a Handover Attach.

In Example 40, the subject matter of any one or more of Examples 38-39 optionally include, further comprising: means for assigning a new IP address to the UE during handover of the UE between access systems using the IP anchor and the HSS in response to the UE using an Attach Request comprising a Request Type that is free from an indication of a Handover Attach.

In Example 41, the subject matter of any one or more of Examples 36-40 optionally include that the UE is connected with the EPC through a radio access network that uses a radio access technology selected from one of: General Packet Radio Services (GPRS), Universal Mobile Telecommunications System (UMTS), a 4th generation (4G) system or an LTE-anchored 5G booster cell operating in Dual Connectivity mode.

In Example 42, the subject matter of any one or more of Examples 36-41 optionally include that the UE is connected with the 5G core network through a radio access network relying on a standalone 5G radio access technology.

In Example 43, the subject matter of any one or more of Examples 36-42 optionally include that the UE retains independent Packet Data Network (PDN) connections for each of the LTE and 5G access systems.

In Example 44, the subject matter of any one or more of Examples 36-43 optionally include, further comprising: means for providing a multi-access Packet Data Network (PDN) connection for the UE, the multi-access PDN connection having a connection established with each of the LTE and 5G access systems with an Internet Protocol (IP) anchor that is common to both the LTE and 5G access systems.

In Example 45, the subject matter of Example 44 optionally includes that the UE uses IP flow mobility (NBIFOM) mechanisms when handing over an IP flow from one of the LTE and 5G access systems to the other of the LTE and 5G access systems.

In Example 46, the subject matter of any one or more of Examples 36-45 optionally include that at least one of: the UE is attached to a 5G booster eNB connected with a LTE anchor, the UE is attached to a 5G standalone eNB that is connected with the 5G core network and is free from being connected with the EPC, or the UE is attached to a 5G dual mode eNB that is connected with the 5G core network and is connected with the EPC through a LTE anchor eNB.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising processing circuitry, wherein the processing circuitry is configured to cause a user equipment (UE) to:
   perform attachment to a first core network of a first system via a first cell, wherein the first cell corresponds to a first radio access technology (RAT);
   perform attachment to a second core network of a second system via a second cell, wherein the second cell corresponds to a second RAT, different from the first RAT;
   determine whether internet protocol (IP) address preservation is required in association with moving a session from the first core network to the second core network;
   select a first procedure type to perform to move the session from the first core network to the second core network based on a determination that IP address preservation is required, wherein the first procedure type is selected when IP address preservation is required and a second procedure type is selected when IP address preservation is not required; and
   move the session from the first core network to the second core network according to the first procedure type which enables the second core network to retrieve a packet gateway (PGW) already selected by the first core network.

2. The apparatus of claim 1, wherein the first procedure type is a procedure for either an evolved packet core (EPC) or 5G system.

3. The apparatus of claim 1, wherein mobility management mechanisms are independent for the first core network and the second core network.

4. The apparatus of claim 1, wherein the UE is in a connected mode with respect to one of the first core network or the second core network, and in an idle mode with respect to the other one of the first core network or the second core network.

5. The apparatus of claim 1, wherein session management is different between the first core network and the second core network.

6. The apparatus of claim 1, wherein connection model is different between the first core network and the second core network.

7. The apparatus of claim 1, wherein the first core network and the second core network share common subscriber storage.

8. The apparatus of claim 1, wherein an address of the PGW is stored at Home Subscriber Storage (HSS).

9. The apparatus of claim 1, further comprising:
   a radio transceiver coupled to the processing circuitry; and
   one or more antennas coupled to the radio transceiver.

10. A non-transitory memory medium storing program instructions, wherein the program instructions, when executed by processing circuitry, cause a user equipment (UE) to:
    perform attachment to a first core network of a first system via a first cell, wherein the first cell corresponds to a first radio access technology (RAT);
    perform attachment to a second core network of a second system via a second cell, wherein the second cell corresponds to a second RAT, different from the first RAT;
    determine whether internet protocol (IP) address preservation is required in association with moving a session from the first core network to the second core network;
    select a first procedure type to perform to move the session from the first core network to the second core network based on a determination that IP address preservation is required, wherein the first procedure type is selected when IP address preservation is required and a second procedure type is selected when IP address preservation is not required; and
    move the session from the first core network to the second core network according to the first procedure type which enables the second core network to retrieve a packet gateway (PGW) already selected by the first system.

11. The non-transitory memory medium of claim 10, wherein the first procedure type is a procedure for either an evolved packet core (EPC) or 5G system.

12. The non-transitory memory medium of claim 10, wherein mobility management mechanisms are independent for the first core network and the second core network.

13. The non-transitory memory medium of claim 10, wherein the UE is in a connected mode with respect to one of the first core network or the second core network, and in an idle mode with respect to the other one of the first core network or the second core network.

14. The non-transitory memory medium of claim 10, wherein session management is different between the first core network and the second core network.

15. The non-transitory memory medium of claim 10, wherein connection model is different between the first core network and the second core network.

16. The non-transitory memory medium of claim 10, wherein quality of service is different between the first and second systems.

17. The non-transitory memory medium of claim 10, wherein the first core network and the second core network share common subscriber storage.

18. A method for operating a user equipment (UE), the method comprising:
    performing attachment to a first core network of a first system via a first cell, wherein the first cell corresponds to a first radio access technology (RAT);
    performing attachment to a second core network of a second system via a second cell, wherein the second cell corresponds to a second RAT, different from the first RAT;

determining whether internet protocol (IP) address preservation is required in association with moving a session from the first core network to the second core network;

selecting a first procedure type to perform to move the session from the first core network to the second core network based on a determination that IP address preservation is required, wherein the first procedure type is selected when IP address preservation is required and a second procedure type is selected when IP address preservation is not required; and moving the session from the first core network to the second core network according to the first procedure type which enables the second core network to retrieve a packet gateway (PGW) already selected by the first core network.

19. The method of claim 18, wherein the first procedure type is a procedure for either an evolved packet core (EPC) or 5G system.

20. The method of claim 18, wherein mobility management mechanisms are independent for the first and second systems, wherein the UE is in a connected mode with respect to one of the first and second systems, and in an idle mode with respect to the other one of the first and second systems.

* * * * *